E. H. BELKNAP.
CLUTCH.
APPLICATION FILED MAY 31, 1913.

1,091,474.

Patented Mar. 31, 1914.

Witnesses:
Anna M. Dorr.
Lewis E. Flanders.

Inventor
Ellsworth H. Belknap
by
Attys

UNITED STATES PATENT OFFICE.

ELLSWORTH H. BELKNAP, OF DETROIT, MICHIGAN, ASSIGNOR TO GOLDEN, BELKNAP AND SWARTZ COMPANY, OF DETROIT, MICHIGAN, A CORPORATION OF MICHIGAN.

CLUTCH.

1,091,474.  Specification of Letters Patent.  Patented Mar. 31, 1914.

Application filed May 31, 1913. Serial No. 770,398.

*To all whom it may concern:*

Be it known that I, ELLSWORTH H. BELKNAP, a citizen of the United States of America, residing at Detroit, in the county of Wayne and State of Michigan, have invented certain new and useful Improvements in Clutches, of which the following is a specification, reference being had therein to the accompanying drawings.

In the operation of clutches and more particularly those of the friction type commonly in use in automobile transmission mechanism, it is necessary, under the usual construction, to provide means for compensating for wear so that the parts may always be held in proper relation. This necessitates the presence of adjusting members and the complications of structure which arise therefrom.

This invention relates to a clutch and to an arrangement thereof whereby it is practically self adjusting, the parts being so disposed that wear does not effect its operation and that a gradual gripping action is obtained that fits it especially for use in connection with automobiles or the like where it is necessary to avoid shock.

The invention consists in the matters hereinafter set forth and particularly pointed out in the appended claims.

Figure 2:
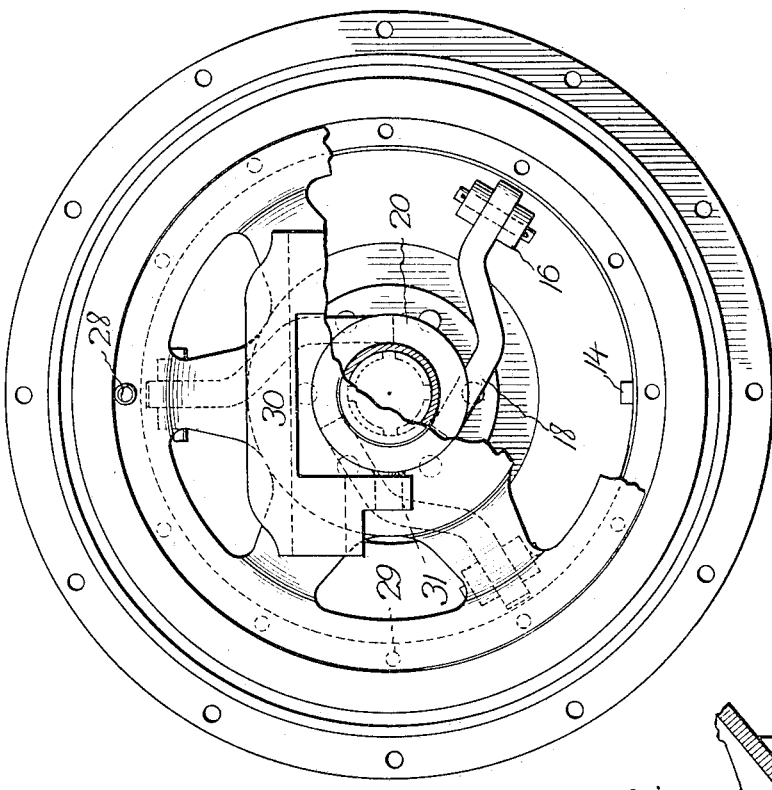
Figure 1:
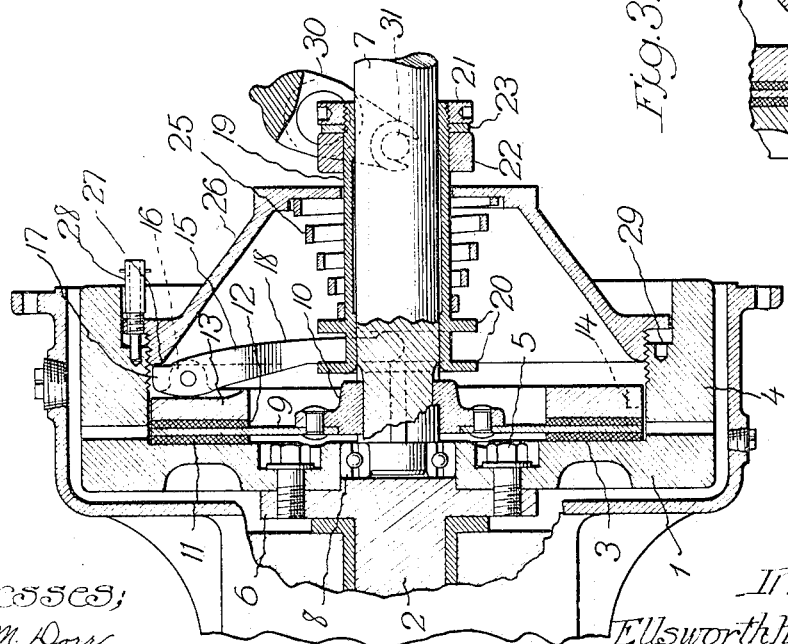
Figure 3:
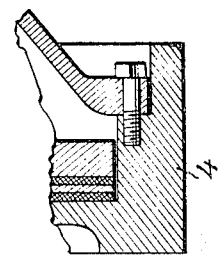

In the drawings, Figure 1 is a view in section of a clutch that embodies features of the invention; Fig. 2 is a view in front elevation thereof, partially broken away; and Fig. 3 is a view in detail of a slight modification in construction.

Referring to the drawings, a driving member 1 is arranged to be keyed or secured to any shaft, as for example, that shown at 2, from which power is to be transmitted. As herein shown the member 1 is the fly wheel of a motor, and in any event has a plane annular face indicated at 3 and an annular margin flange or rim 4 which is counterbored or otherwise finished interiorly. As herein shown the member 1 is coupled to the shaft by cap screws 5 engaging a collar 6 on the shaft.

A shaft 7 to which power is to be transmitted is stepped at its inner end in an anti-friction bearing indicated at 8 that is of any preferred type and is mounted concentrically in the member 1. A circular drive plate 9 of steel or like suitable material is secured as by a hub 10 on the shaft 7 to turn therewith and have limited lateral movement thereon, the hub being keyed, splined or otherwise fitted to the shaft to produce this result. A friction ring 11 is placed on the disk 9 to bear against the annular face 3 of the member 1. This ring with a companion outer drive ring 12 that is likewise placed on the plate 9, is made of special material commonly used in clutches of this character, usually in the form of an asbestos fabric or body interwoven with copper strands or other suitable metal members, and is a stock article of manufacture. A presser ring 13 that is longitudinally reciprocable and non-rotatable in the clutch 4, bears against the outer ring 12. Preferably the ring has notches or gains in its periphery engaged by ribs or feathers 14 on the flange 4 so that the ring turns with the flange while it is movable to and from the face of the member 1. Levers 15 are pivoted near their inner ends between lugs 16 of the presser ring with their inner fulcrum end portions 17 adjacent the inner periphery of the flange 4 while their outer end portions 18 overlie the shaft 7.

A sleeve 19 is longitudinally reciprocable and rotatable on the shaft 7 and has a peripheral groove near its inner end, preferably formed by parallel flanges 20, that is engaged or entered by the end portions 18 of the clutch levers 15. A stop collar 21 is secured on the outer end of the sleeve with a yoke collar 22 that is rotatable on the sleeve bearing against its inner face, a friction washer 23 being interposed. The sleeve 19 is normally projected toward the face of the member 1 by a suitably disposed spring member 25 that encircles the sleeve in compression between one of the flanges 18 and the outer portion of the spider 26. Preferably the spring 25 is conoidal so that it may be fully compressed on itself without having its coils conflicting with each other. The spider 26 is screwthreaded into or otherwise secured in the flange 4 and has an inner rounded edge portion 27 against which the ends 17 of the levers 15 bear or fulcrum. Where the screwthreaded adjustment of the spider 26 is used, a spring latch member 28 may also be employed to engage in any one of a series of sockets 29 in the flange 4 whereby the spider may be held in adjusted position. Or the spider may be screwed to fixed position as indicated in detail in Fig.

3. A rock arm 30 whose forked and slotted end portions, engage pintles 31 on the ring 22, may be employed to shift the sleeve 19 to hold the clutch out of engagement.

In operation, after the spider is screwed to adjusted position, the spring member holds the levers and the thrust ring always in contact with the friction rings of the drive plate within the range of motion of the spring, thereby preventing any play between the parts and avoiding the necessity of any take-up means. The effect of the spring on the levers is sufficient to hold the friction members in engagement owing to the great difference in length between the lower arms and power arms of the levers which extend well past the shaft. The engagement of the sleeve with the lever ends is positive and does not have the disadvantage that occurs where wedge members are used for operating the levers. When once adjusted, the clutch maintains itself in operative condition until the friction rings are worn out and as these may be readily replaced by simply removing the spider and follower plate and putting in new rings, the up-keep of the clutch is nominal. The nature of the frictional surfaces are such that they operate with or without lubrication.

Obviously, changes in the details of construction may be made without departing from the spirit of my invention and I do not care to limit myself to any particular form or arrangement of parts.

What I claim is:—

1. A clutch comprising a driving member, a spider secured in spaced relation thereto, a shaft extending loosely through the spider concentric therewith, a driving plate non-rotatable and longitudinally reciprocable on the shaft between the spider and member, a friction ring between the proximate faces of the drive plate and driving member, a presser ring between the spider and the driving plate, levers pivotally secured on the presser ring and arranged to bear at their outer ends against the spider, a sleeve rotatable and reciprocable on the shaft engaging the free ends of the lever, a spring in compression between the sleeve and the spider for yieldingly holding the plate, the ring and the driving member in frictional engagement, and means for positively shifting the sleeve to disengage the driving plate.

2. A clutch comprising a driving member having recessed annular face, a spider adjustably secured in spaced relation on the driving member, a shaft extending through the spider loosely and in axial alinement with the driving member, a drive plate non-rotatable and longitudinally reciprocable on the shaft between the driving member and the spider, a presser ring between the drive plate and spider, friction rings interposed between the drive plate and the adjacent faces of the member and presser plate, levers mounted on the presser ring and fulcrumed against the spider, a spring normally in compression between the spider and the levers for maintaining the rings and driving plate in frictional engagement, and means forming the connection between the spring and levers and operating to positively move the levers in opposition to the spring.

3. A clutch comprising a driving member, a spider adjustably secured concentrically on the driving member, a shaft extending loosely through the spider in substantially axial alinement with the driving member, a drive plate non-rotatable and longitudinally reciprocable on the shaft, means for frictionally connecting the driving plate and driving member, and spring operated means mounted on and within the spider and adapted to normally hold the driving plate, driving member and frictional engaging means in contact.

4. A clutch comprising a driving member having a circular recess in its outer face, a spider secured to the recessed face of the driving member in axial alinement therewith, a shaft extending loosely through the spider in axial alinement with the driving member, a drive plate non-rotatable and longitudinally reciprocable on the shaft, a presser ring in the circular recess of the driving member substantially concentric with the shaft, friction rings interposed between the driving plate, the driving member and the presser ring, a sleeve rotatable and longitudinally reciprocable on the shaft, oscillatory means mounted on the presser ring and engaged at one extremity by the spider and at the other by the sleeve and spring, and spring means bearing against the spider and moving the sleeve and oscillatory means for holding the presser ring, drive plate and driving member in frictional engagement through the friction rings.

5. A clutch comprising a driving member having an annular face encircled by a marginal flange, a spider in screwthreaded engagement with the flange and in spaced relation to the annular face, a shaft that extends loosely through the spider and is stepped at its inner end in the driving member concentrically therewith, a drive plate non-rotatable and longitudinally reciprocable adjustably on the shaft adjacent the annular face of the driving member, a presser ring loosely mounted in the flange between the drive plate and the spider, friction rings interposed between the drive plate, the presser ring and the driving member, levers pivoted on the presser ring and fulcrumed near their outer ends on the spider, a sleeve rotatable and reciprocable on the shaft engaging the other end portions of the levers, a spring encircling the sleeve and bearing against the spider for projecting the sleeve inwardly, and manually operable means for shifting the sleeve in opposition to the spring for releasing the drive plate.

6. A clutch comprising a fly wheel having a plane annular face, an annular flange on the wheel substantially concentric with the face, a spider in screwthreaded engagement with the flange, a shaft through the spider journaled at its inner end in the driving member, a drive plate non-rotatable and longitudinally reciprocable on the shaft within the flange and adjacent the annular face of the fly wheel, friction rings on each side of the drive plate, a presser ring within the wheel flange bearing against a friction ring, levers pivoted between their ends on the presser ring and fulcrumed near their outer ends against the spider, a sleeve rotatable and reciprocable on the shaft engaging the other end portions of the levers, and a spring bearing against the spider and normally projecting the sleeve to hold the presser ring and drive plate frictionally engaged with the fly wheel.

In testimony whereof I affix my signature in presence of two witnesses.

ELLSWORTH H. BELKNAP.

Witnesses:
ANNA M. DORR,
G. E. McGRANN.